(12) United States Patent
Chari

(10) Patent No.: US 11,869,377 B1
(45) Date of Patent: Jan. 9, 2024

(54) TACTILE GRAPHIC DISPLAY AND METHODS OF USE THEREOF

(71) Applicant: Kailash P. Chari, North Andover, MA (US)

(72) Inventor: Kailash P. Chari, North Andover, MA (US)

( * ) Notice: Subject to any disclaimer, the term of this patent is extended or adjusted under 35 U.S.C. 154(b) by 0 days.

(21) Appl. No.: 18/136,645

(22) Filed: Apr. 19, 2023

(51) Int. Cl.
*G09B 21/00* (2006.01)

(52) U.S. Cl.
CPC .................................. *G09B 21/004* (2013.01)

(58) Field of Classification Search
CPC .... G09B 21/00; G09B 21/001; G09B 21/003; G09B 21/004
See application file for complete search history.

(56) References Cited

U.S. PATENT DOCUMENTS

| | | | | |
|---|---|---|---|---|
| 4,871,992 A * | 10/1989 | Petersen | ............. | G09B 21/003 340/407.1 |
| 5,466,154 A * | 11/1995 | Thompson | ........... | G09B 21/003 434/114 |
| 5,772,440 A * | 6/1998 | Ida | ....................... | G09B 21/004 340/407.1 |
| 6,705,868 B1 * | 3/2004 | Schleppenbach | .... | G09B 21/004 434/114 |
| 6,734,785 B2 * | 5/2004 | Petersen | ............. | G09B 21/004 340/407.1 |
| 7,497,687 B2 * | 3/2009 | Shin | ...................... | G09B 21/004 434/114 |
| 7,777,137 B2 * | 8/2010 | Ahn | ...................... | G09B 21/004 434/112 |
| 9,142,143 B2 | 9/2015 | Chari | | |
| 9,812,033 B2 | 11/2017 | Chari et al. | | |
| 10,083,628 B2 * | 9/2018 | Yip | ....................... | G09B 21/004 |
| 10,249,217 B2 | 4/2019 | Moon et al. | | |
| 10,453,359 B2 * | 10/2019 | Kim | ...................... | H04M 1/0202 |
| 10,692,637 B2 * | 6/2020 | Zarate | .................. | G09B 21/004 |
| 11,011,076 B2 * | 5/2021 | Seo | ......................... | G06F 3/016 |
| 11,033,187 B2 * | 6/2021 | Li | ......................... | G09B 21/003 |
| 11,410,574 B2 * | 8/2022 | Yang | .................... | G09B 21/004 |
| 11,436,943 B2 * | 9/2022 | Pitts | ..................... | G09B 21/004 |
| 11,645,948 B2 * | 5/2023 | Moon | .................. | G09B 21/004 434/114 |
| 2009/0023116 A1 * | 1/2009 | Shaw | .................... | G09B 21/003 434/114 |
| 2015/0317915 A1 * | 11/2015 | Nelson | ................. | G09B 21/003 434/114 |
| 2022/0230517 A1 * | 7/2022 | Kim | ..................... | G09B 21/004 |

* cited by examiner

*Primary Examiner* — Kurt Fernstrom
(74) *Attorney, Agent, or Firm* — Burns & Levinson LLP; Bruce D. Jobse; Marlo Schepper Grolnic

(57) ABSTRACT

A tactile graphic display comprises an array of pin assemblies that can be individually activated to rise a selective distance above a plane, taking the shape of 3D objects and text in essentially real time. Each pin assembly of the array is operatively coupled to a permanent magnet that is slidable within an electromagnetic coil. When current is applied in a first direction to the coil, the magnet is repelled by the coil, causing it to move upwards and thus causing the pin to project from the array. When current is applied to the coil in the opposite direction, the magnet is attracted to the coil and moves downward, causing the pin assembly to retreat from the array. A latch member is configured to selectively engage and disengage a surface feature on the pin assembly for locking and unlocking a position of the pin assembly relative to the frame.

20 Claims, 15 Drawing Sheets

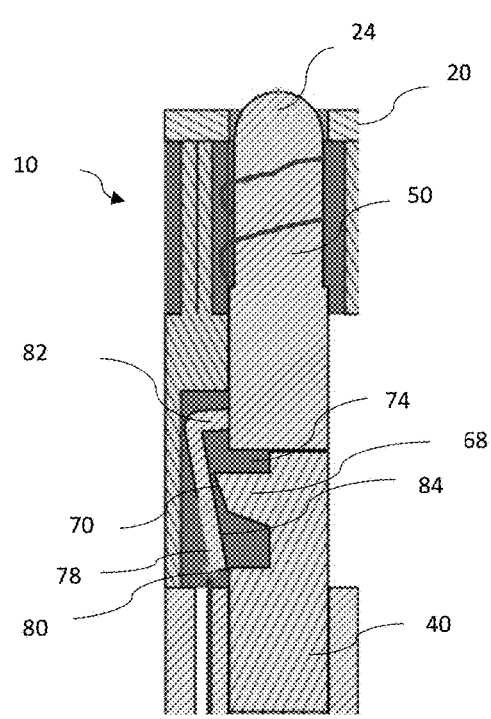
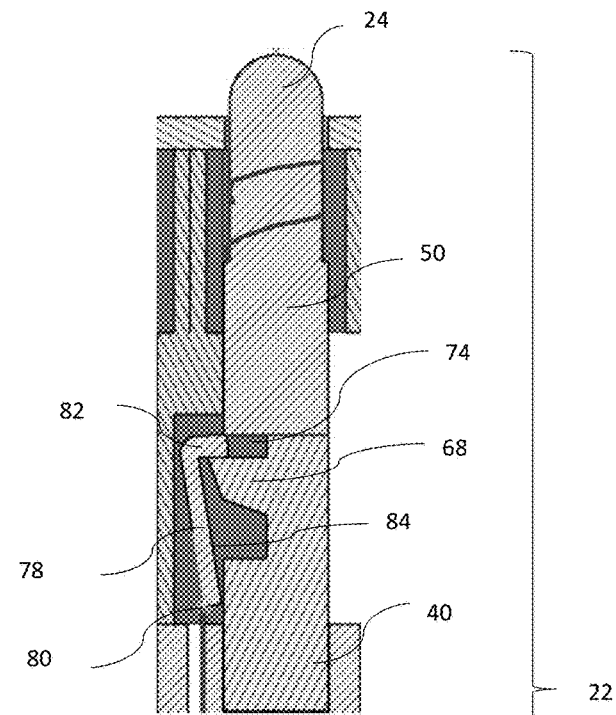
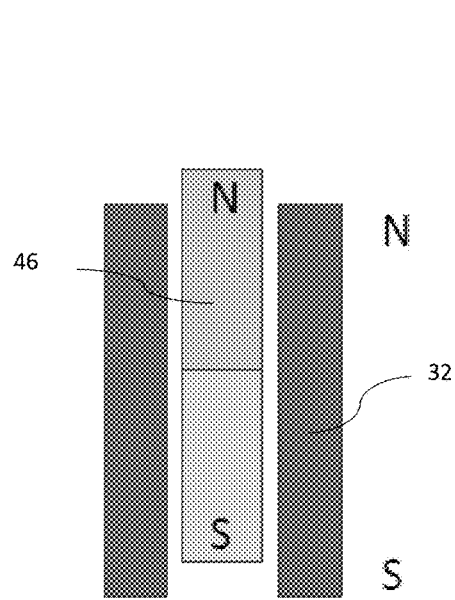
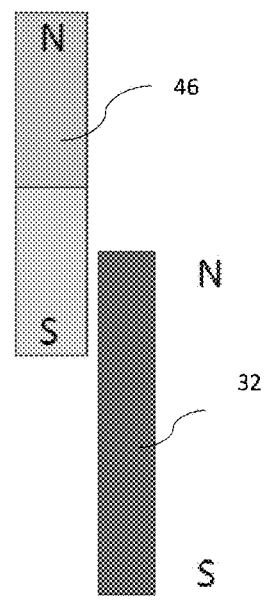
FIG. 6A                                    FIG. 6B

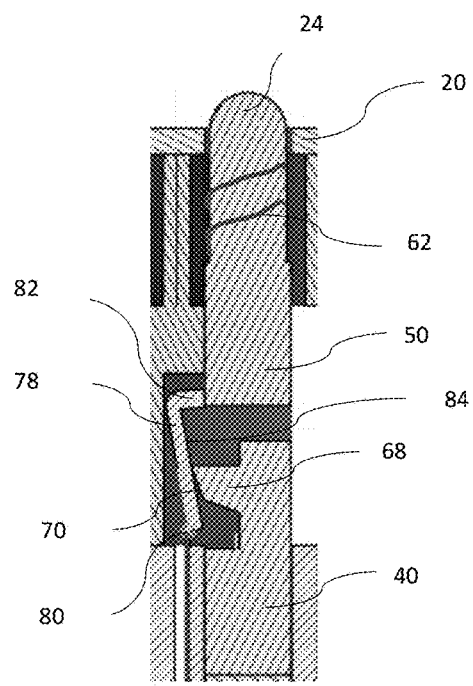
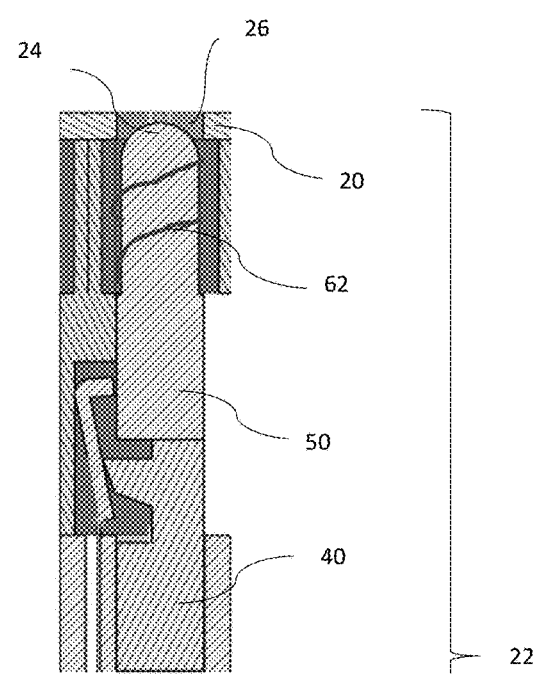
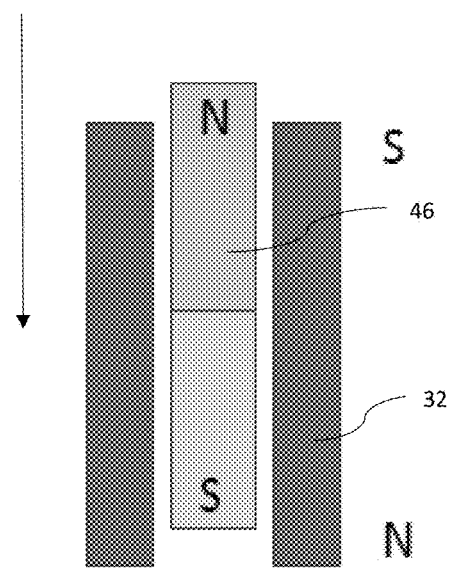
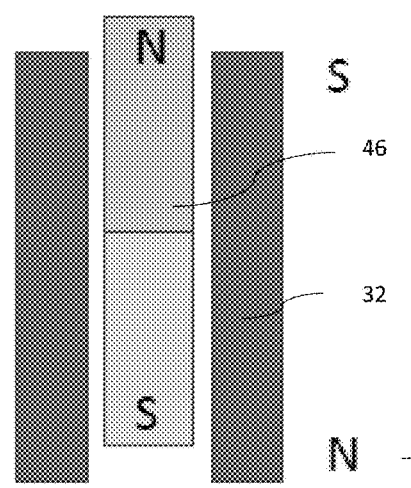
FIG. 6C  FIG. 6D

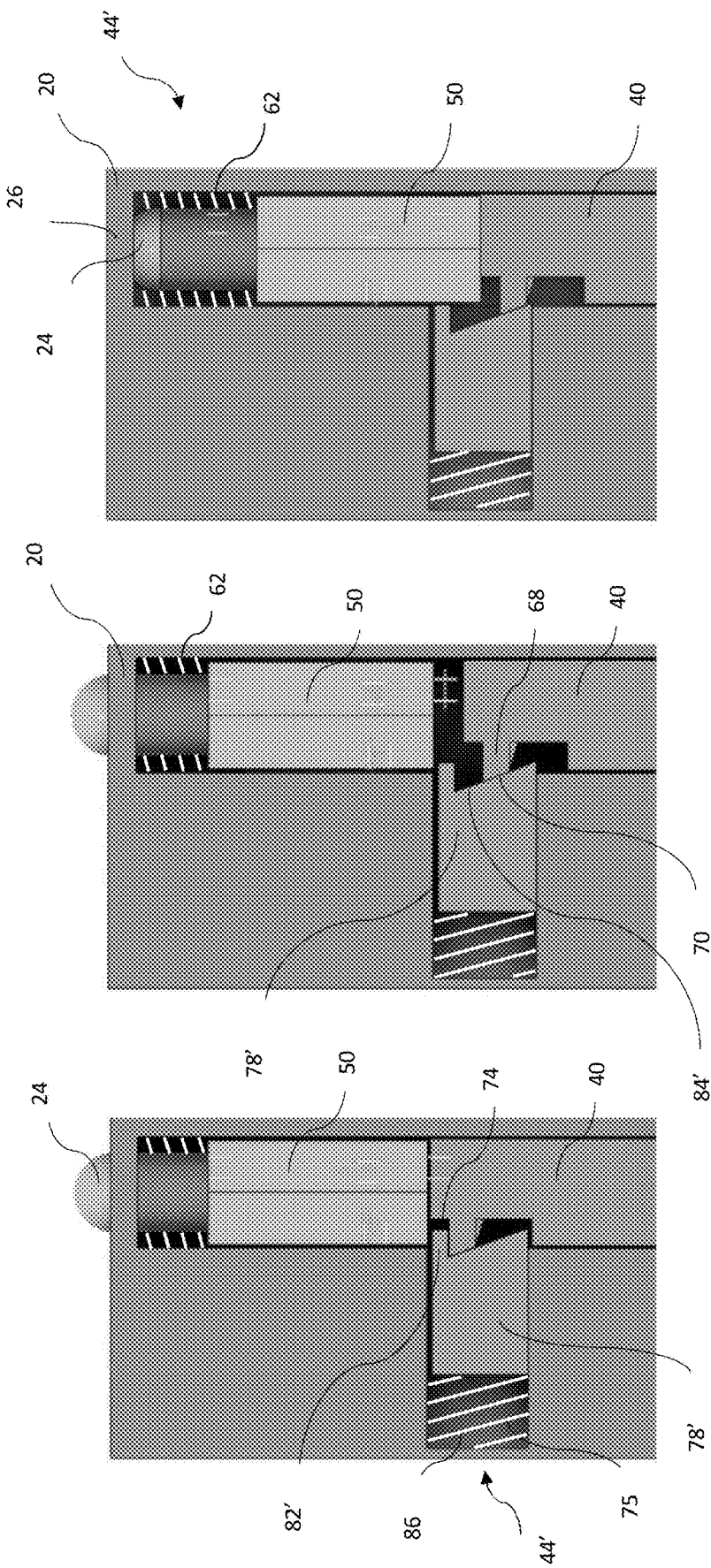

TACTILE GRAPHIC DISPLAY AND METHODS OF USE THEREOF

FIELD

The present disclosure relates to a pin assembly for use in a refreshable tactile graphic and braille display and, more particularly, to a pin assembly for use in an array enabling a real-time, 3D display of objects and text for visually impaired users.

BACKGROUND

A goal of the assistive technology industry is to give the blind greater accessibility, functionality, and ability to function with more independence. Many groundbreaking and life-changing innovations have revolutionized the previously primitive means of assistance for the blind. However, one area of the industry that has faced many challenges is the dynamic tactile display. A tactile display allows for tactile representations of text and imagery, offering blind users an alternative that appeals to a more acute sense of touch.

Conventional tactile displays use a two-dimensional array of dots, which can be arranged in various simple or sophisticated patterns. Over the years, these devices have greatly improved but have not yet reached a state of adequate performance and affordable cost. Rather, companies in the field have struggled to create displays with high enough resolution that would enable the user to experience text and 3D objects in real time, offering the user a more in-depth and intricate experience of a world they cannot see. Such difficulties arise because of the small size and complex mechanisms of the display, as well as other challenges, making sophisticated tactile displays difficult to create with existing technology.

SUMMARY

The disclosure describes a tactile graphic display comprising an array of pin assemblies that can be individually activated to rise anywhere from a fraction of an inch to several inches above the plane, taking the shape of 3D objects and text in essentially real time. Each pin assembly of the array is operatively coupled to a permanent magnet that is slidable within an electromagnetic coil. When current is applied in a first direction to the coil, the magnet is repelled by the coil, causing it to move upwards and thus causing the pin assembly to project from the array. When current is applied to the coil in the opposite direction, the magnet is attracted to the coil and moves downward, causing the pin assembly to retreat from the array. A latch member is configured to selectively engage and disengage a surface feature on the pin assembly for locking and unlocking a position of the pin assembly relative to the frame.

The disclosure provides several advantages compared to the known prior art. First, the display provides a greater upward force of the pin that can push against a finger that might be obstructing the pin. Second, the disclosure also provides a permanent latching mechanism that makes the pins completely rigid to the user's finger. This rigidity gives the user a superior braille and tactile reading experience by providing the equivalent of higher tactile contrast. Finally, the display can be coupled to other displays to create a large array of pins.

Embodiments of the tactile graphic display of this disclosure may include one or more of the following, in any suitable combination.

In embodiments, a tactile graphic display of this disclosure includes a frame and a plurality of pin assemblies extending through the frame. Each one of the pin assemblies includes a pin having a first, finger-engageable end extendable and retractable through an opening in a surface of the frame. Each pin assembly also includes a pulser member having a first end configured to contact a second end of the pin. A portion of the pulser member defines a ledge. The ledge defines a slot between the second end of the pin and the ledge when the pulser member is in contact with the pin. Each pin assembly also includes a magnet proximate to a second end of the pulser member. The magnet is capable of transitioning between different positions relative to a coil. Current applied in a first direction to the coil causes the magnet to move relative to the coil, in turn causing the first, finger-engageable end of the pin to move relative to the opening in the surface of the frame.

In further embodiments, the tactile graphic display also includes a spring disposed about a first region of the pin. The spring is configured to bias the pin toward the coil. In embodiments, the tactile graphic display also includes a latch member configured to selectively engage and disengage from the slot for locking and unlocking a position of the pin relative to the frame. In embodiments, the coil is an electromagnetic coil. In embodiments, the magnet is a permanent magnet. In embodiments, the coil is configured to have a first magnetic polarity when the current is applied to the coil in the first direction, and to have a reverse magnetic polarity when the current is applied to the coil in a second direction.

In further embodiments, the frame includes a first section coupleable to a circuit board. The first section includes a plurality of open cavities for housing one of the plurality of coils. In embodiments, when housed within the cavities, the coils are electronically coupled to the circuit board. In embodiments, the frame further includes a second section coupled to the first section. The second section defines a plurality of channels. The plurality of channels are sized and shaped for slidably receiving a lower region of the pulser member. In embodiments, the first section of the frame further includes a plurality of pillars disposed between the open cavities. The pillars are configured to support the second section of the frame. In embodiments, the second section of the frame further defines a plurality of slots extending between the channels. The slots are configured to receive a mounting portion of a latch assembly. In embodiments, the latch assembly further includes a plurality of latch members flexibly coupled to the mounting portion. Each of the latch members are biased toward the pulser member. In embodiments, the frame further includes a third section coupled to the second section. The third section defines a plurality of through holes. The through holes are sized and shaped for slidably receiving a lower portion of the pin. In embodiments, the frame further includes a fourth section coupled to the third section. The fourth section defines the opening in the surface of the frame. In embodiments, a second end of the pin is coupled to a shock-absorbent layer. In embodiments, the display further includes a position sensing mechanism for sensing a vertical position of the pin.

Embodiments of an array of this disclosure include a plurality of tactile graphic displays as claimed in claim 1.

Other embodiments of a tactile graphic display of this disclosure include a frame and a plurality of pin assemblies forming an array. Each one of the pin assemblies includes a pin having a first, finger-engageable end extendable and retractable through an opening in a surface of the frame. Each pin assembly also includes a pulser member having a first end configured to contact a second end of the pin. The pin assembly further includes a latch member configured to selectively engage and disengage a lower surface of the pin for locking and unlocking a position of the pin relative to the frame. The pin assembly further includes a magnet responsive to an electrical current and disposed proximate a second end of the pulser member. The magnet and the pulser member are capable of transitioning between different positions relative to the frame. The position of the magnet and the pulser member determines whether the latch member is selectively engaged or disengaged with the lower surface of the pin.

Embodiments of a latch assembly for use in a tactile graphic display, the tactile graphic display including a pin assembly, include at least one latch member configured to selectively engage and disengage a surface feature on the pin assembly for locking and unlocking a position of the pin assembly relative to a frame of the tactile graphic display. In embodiments, the at least one latch member is configured to be moved into an unlatched position by downward movement of the pin assembly and the magnet. In other embodiments, the at least one latch member is configured to be moved into a latched position by upward movement of the pin assembly and the magnet.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein:

FIGS. 6A and 6B are cut-away views schematically illustrating the upward stroke of a pin in the assembly of the tactile graphic display of FIGS. 1 and 2 according to an embodiment of the disclosure;

FIGS. 6C and 6D are cut-away views schematically illustrate the downward stroke of the pin assembly of the tactile graphic display of FIGS. 1 and 2 according to an embodiment of the disclosure;

FIGS. 7A-7C schematically illustrate an alternative version of the latch assembly of the tactile graphic display of FIGS. 1 and 2 according to an embodiment of the disclosure;

DETAILED DESCRIPTION

Figure 1:
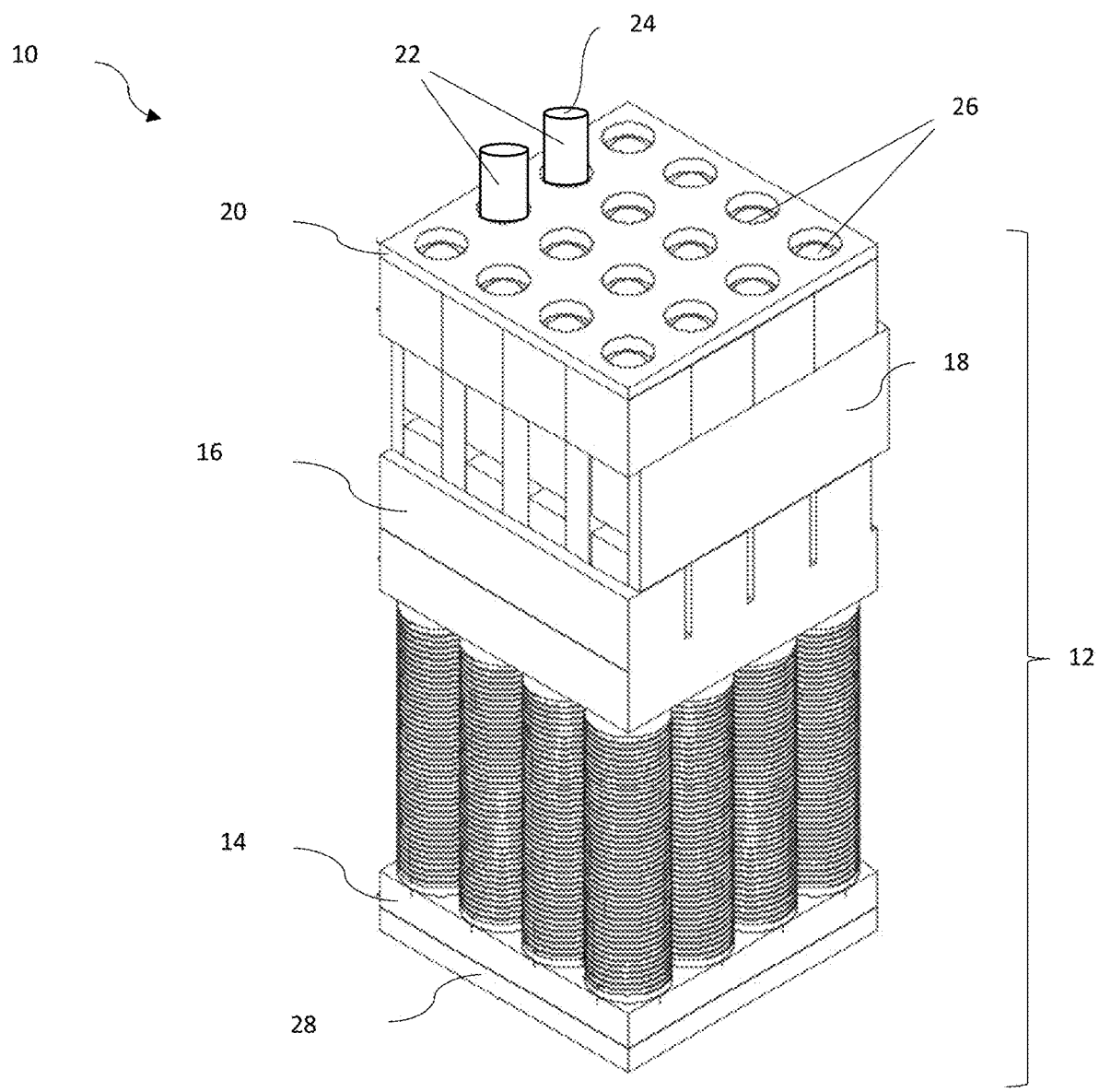
FIG. 1 illustrates a tactile graphic display in an assembled, perspective view according to an embodiment of the disclosure.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below," "upper," "lower," and the like helps only in the clear description of the disclosure and does not limit the structure, positioning and/or operation of the disclosure in any manner.

FIG. 1 illustrates a tactile graphic display 10 in an assembled view according to an embodiment of the disclosure. As shown in FIG. 1, the display 10 may include a frame 12 having a first section 14, a second section 16, a third section 18 and a fourth section 20. A plurality of pin assemblies 22 may extend through the frame 12 such that a finger-engageable end 24 of each pin assembly 22 is projectable through an opening 26 in the fourth section 20 of the frame 12. The first section 14 may couple to a circuit board 28, which may be made from rigid or flexible materials. In embodiments, the display 10 may be formed in an array comprising sixteen openings 26 and sixteen pin assemblies 22 arranged in a 4×4 grid configuration, as shown. However, the disclosure contemplates that the array may be scaled to contain any number of openings 26 and pin assemblies 22 arranged in any suitable manner. For example, the frame 12 may contain an attachment means for attachment to additional frames 12 to construct a larger array. The pin assemblies 22 can be spaced equidistantly, as shown. However, the disclosure also contemplates a non-uniform spacing arrangement of the pin assemblies 22.

Figure 2:
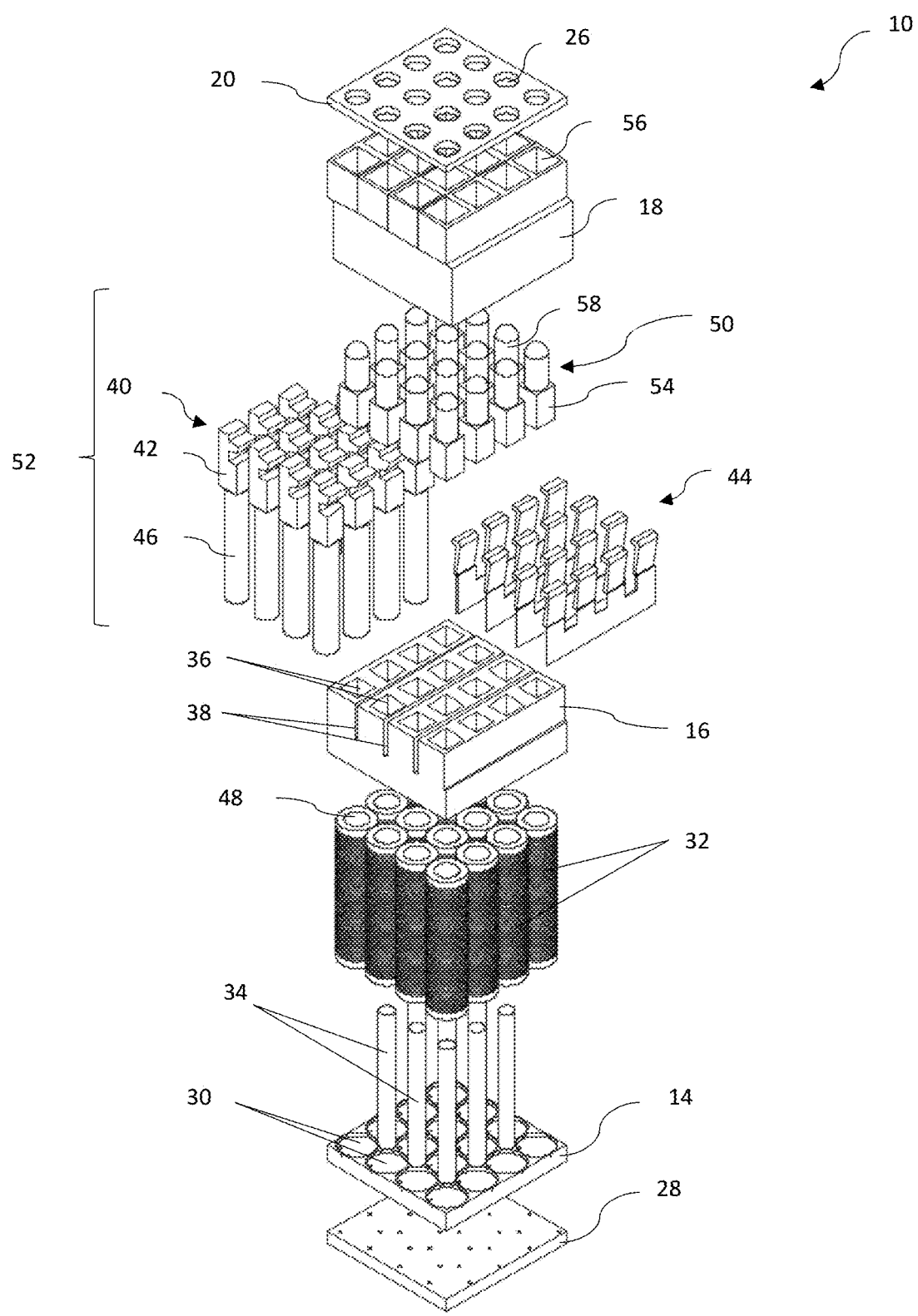
FIG. 2 illustrates the components of the tactile graphic display of FIG. 1 in an exploded view according to an embodiment of the disclosure.

FIG. 2 illustrates the tactile graphic display 10 in an exploded view according to an embodiment of the disclosure. As shown in FIG. 2, the first section 14 of the frame 12 may define a plurality of open cavities 30 that are sized and shaped for housing a respective one of a plurality of electromagnetic coils 32. For example, the cavities 30 may be circular to correspond to a tubular shape of the coils 32. When housed within the cavities 30, the electromagnetic coils 32 may electronically couple to the circuit board 28. For example, the circuit board 28 may contain a plurality of connections points (not shown) that allow current to flow through the coils 32. The circuit board 28 may further provide mechanical support to both the coils 32 and to the remainder of the frame 12. The first section 14 of the frame 12 may also include a plurality of pillars 34 disposed between the cavities 30. The pillars 34 may be configured to support the second section 16 of the frame 12. The second section 16 of the frame 12 may define a plurality of channels 36 and a plurality of slots 38 extending between the channels 36. The channels 36 may be sized and shaped to slidably receive a lower region 42 of a pulser member 40. For example, the channels 36 and the lower region 42 of the pulser member 40 may have a square shape, although the disclosure contemplates other suitable shapes. The slots 38 may furthermore be configured for housing a portion of a latch assembly 44, as further described below.

Still referring to FIG. 2, a magnet 46 may couple to the lower region 42 of the pulser member 40 for extending through a cannulation 48 of the electromagnetic coil 32. In embodiments, the magnet 46 may be a permanent magnet. The cannulation 48 may be sized to allow the magnet 46 to slide relative to the coil 32 without substantial interference. The pulser member 40 may be further configured to removeably contact the pin 50, such that the pulser member 40, the pin 50 and the magnet 46 may form a moveable pin assembly 52. A lower portion 54 of the plurality of pins 50 may each be configured for slidable movement within one of a plurality of through holes 56 defined by the third section 18 of the frame 12. The third section 18 of the frame 12 may couple to the second section 16. In embodiments, both the lower portion 54 of the pin 50 and the through hole 56 may have a square shape, although the disclosure contemplates other suitable shapes. A cylindrical upper portion 58 of the pin 50 may be configured to extend through the openings 26 in the fourth section 20 of the frame 12 to be engaged by the fingers of the user.

Figure 3:
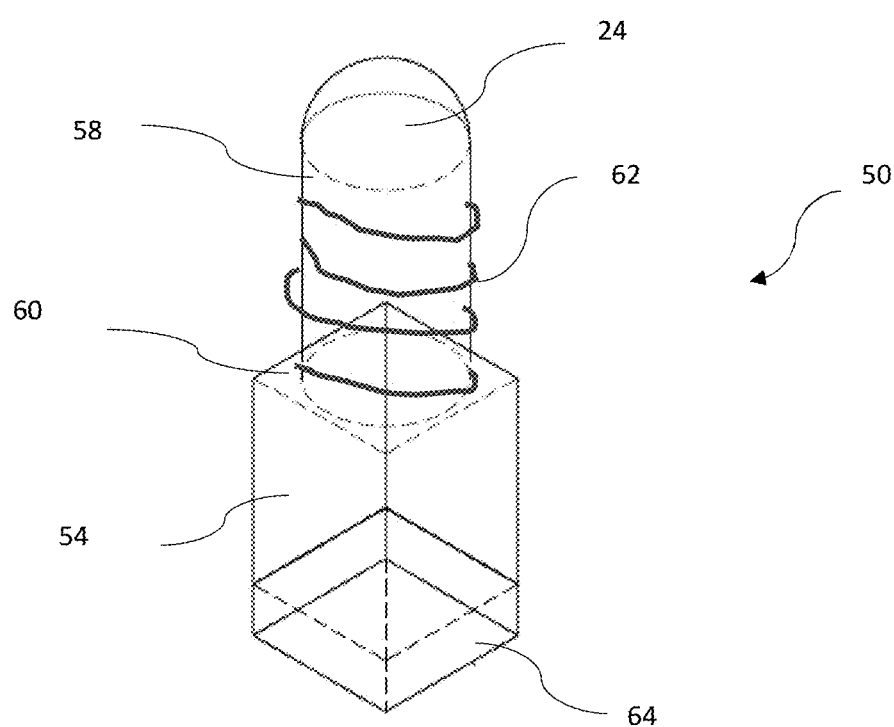
FIG. 3 is a detailed view of a pin of the tactile graphic display of FIGS. 1 and 2 according to an embodiment of the disclosure.

FIG. 3 is a detailed view of the pin 50 according to an embodiment of the disclosure. As shown in FIG. 3, the cylindrical upper portion 58 of the pin 50 may have a rounded or hemispherical finger-engageable end 24. The lower portion 54 of the pin 50 may include an upper surface 60 that acts as a flange for supporting a spring 62 extending around the cylindrical upper portion 58. When the pin 50 is disposed within the frame 12, the spring 62 is positioned between the fourth section 20 of the frame 12 and the upper surface 60 to bias the pin 50 downward, as further described below. The lower portion 54 of the pin 50 may optionally be coupled to a shock-absorbent layer 64.

Figure 4:
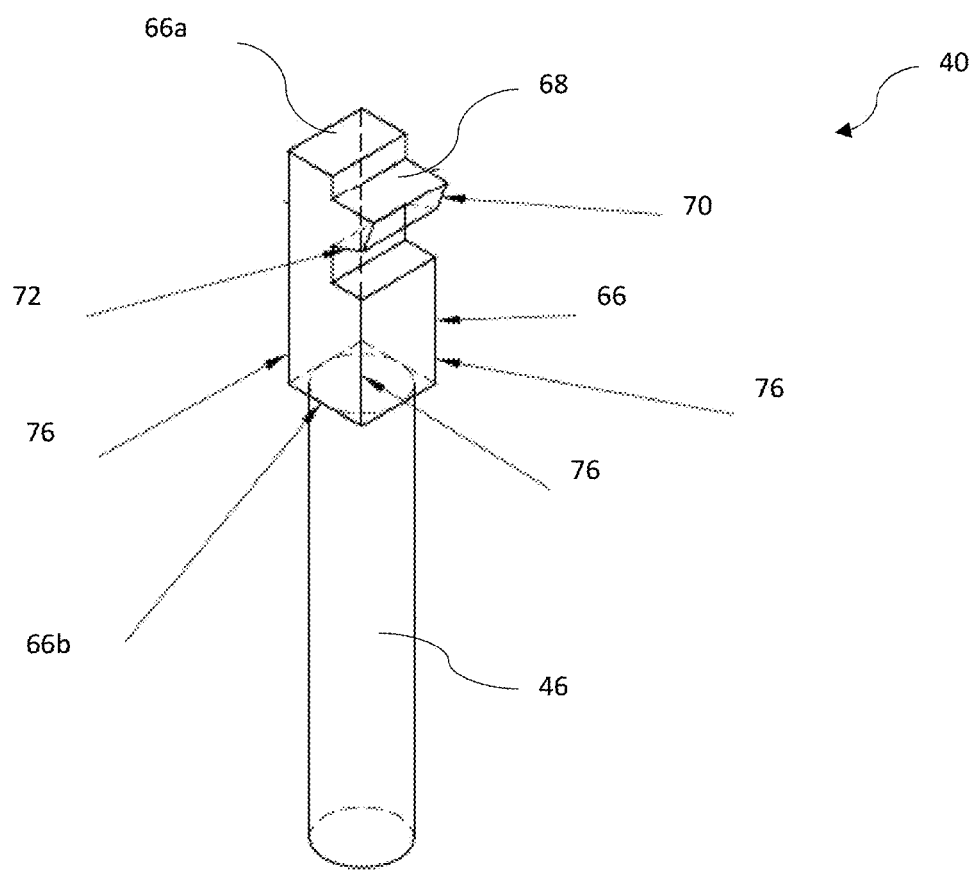
FIG. 4 is a detailed view of a pulser member of the tactile graphic display of FIGS. 1 and 2 according to an embodiment of the disclosure.

FIG. 4 is a detailed view of the pulser member 40 according to an embodiment of the disclosure. As shown in FIG. 4, the pulser member 40 may include a body 66 having a first end 66a and a second end 66b. The magnet 46 may couple to the second end 66b of the body 66. The first end 66a may be configured to selectively contact the lower portion 54 of the pin 50. The body 66 may further define a ledge 68 adjacent the first end 66a. The ledge 68 may have a first angled surface 70 and a second angled surface 72, the purpose of which will be further described below. Because an area of the first end 66a is smaller than an area of the lower portion 54 of the pin 50, a slot 74 (FIG. 6A) may be defined between the ledge 68 and the lower portion 54 of the pin 50 when the first end 66a of the body 66 contacts to the lower portion 54 of the pin 50. The body 66 may define bearing surfaces 76 for slidably interacting with the channels 36 of the frame 12.

Figure 5:
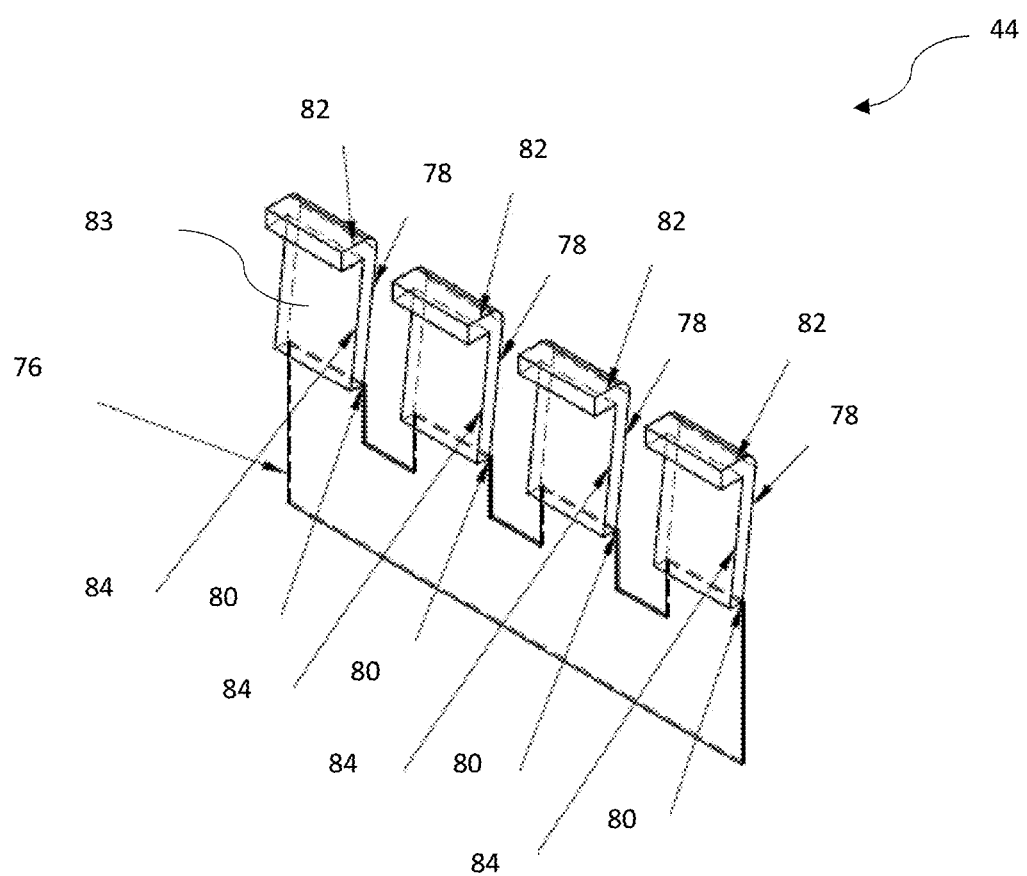
FIG. 5 is a detailed view of a latch assembly of the tactile graphic display of FIGS. 1 and 2 according to an embodiment of the disclosure.

FIG. 5 is a detailed view of a latch assembly 44 according to an embodiment of the disclosure. As shown in FIG. 5, the latch assembly 44 may include a support member 76, which may be made of metal or plastic. The support member 76 may be sized to mount within the slots 38 of the second section 16 of the frame 12. The support member 76 may provide support for at least one latch member 78, each latch member 78 being coupled to the support member 76 at a flexion point 80. Each latch member 78 may further comprise a protrusion 82 configured to selectively move into the slot 74 (FIG. 6A) formed between the ledge 68 of the pulser member 40 and the lower portion 54 of the pin 50, as further described below. An inner surface 84 of the latch member 78 below the protrusion 82 may comprise an angled surface 83 that interacts with the first angled surface 70 of the ledge 68 of the pulser member 40. The latch member 78 may further restrict fluids and dust particles from entering into the lower portions of the frame 12. Examples of the latch assembly 44 may be molded or fabricated from sheet metal, although the disclosure contemplates other materials and methods for making the latch assembly 44.

FIGS. 6A and 6B schematically illustrate the upward stroke of the pin assembly 22 according to an embodiment of the disclosure. In the unlatched configuration of the pin assembly 22 shown in FIG. 6A, the protrusion 82 of the latch member 78 is not engaged with the slot 74, and the finger engageable end 24 of the pin 50 is retracted downward relative to the fourth section 20 of the frame 12. In embodiments, the latch member 78 may be molded such that it extends toward the pulser member 40. To move the finger engageable end 24 upwards, current may flow through the coil 32 in a first direction to create magnetic north (N) and south (S) poles in the coil 32. This may cause the magnet 46 to be repelled by the coil 32 and move upwards relative to the coil 32 such that the south (S) pole of the magnet 46 is adjacent the north (N) pole of the coil 32 (FIG. 6B). Movement of the magnet 46 upward may in turn cause the finger-engageable end 24 to move upwards relative to the fourth section 20 of the frame 12. As the pulser member 40 moves upward, the angled surface 70 of the ledge 68 may disengage from the inner surface 84 of the latch member 78, such that the latch member 78 is able to flex about the flexion point 80 toward the pulser member 40. As shown in FIG. 6B, once the finger-engageable end 24 reaches its upmost travel limit, the latch member 78 may flex about the flexion point 80 toward the pulser member 40 such that the protrusion 82 engages the slot 74. With the protrusion 82 engaging the slot 74, the pin assembly 22 may be in a latched position that prevents movement of the pin 50 downward. In this state of the pin assembly 22, no power is consumed by the display 10.

Figure 6E:
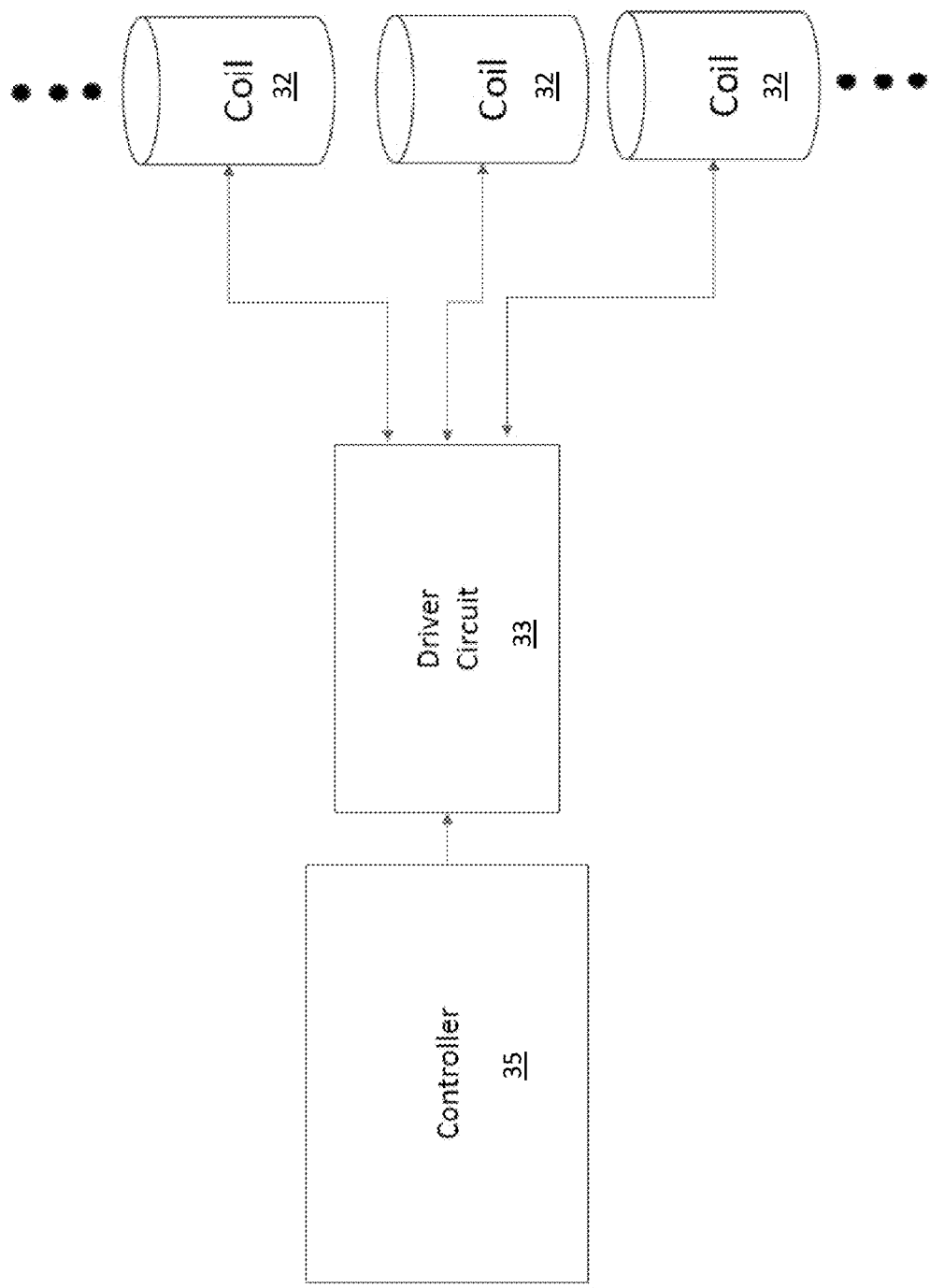
FIG. 6E schematically illustrates the interaction between a controller, a driver circuit and the coils of the tactile graphic display of FIGS. 1 and 2 according to an embodiment of the disclosure.

FIGS. 6C and 6D schematically illustrate the downward stroke of the pin assembly 22 according to an embodiment of the disclosure. In the configuration of the pin assembly 22 shown in FIG. 6C, when current is applied in an opposing second direction to the coil 32, magnetic north (N) and south (S) poles may be formed in the coil 32 in the opposite direction. This may cause the magnet 46 to be attracted to the coil 32 and move downward relative to the coil 32 such that the south (S) pole of the magnet 46 is adjacent the north (N) pole of the coil 32. Movement of the magnet 46 downward may in turn cause the pulser member 40 to move downward away from the pin 50. As the pulser member 40 moves downward, the angled surface 70 of the ledge 68 may again engage the inner surface 84 of the latch member 78, such that the latch member 78 flexes about the flexion point 80 to move the protrusion 82 away from the pin 50. Once the protrusion 82 is no longer blocking the downward path of the pin 50, the spring 62 may act to move the pin 50 downward relative to the fourth section 20 of the frame 12. As shown in FIG. 6D, when the pulser member 40 and the magnet 46 have completed their downward travel, the finger-engageable end 24 has retracted from the opening 26 in the fourth section 20 of the frame 12 and can no longer be felt by the user. Furthermore, the pin 50 may move under force of the spring 62 to once again contact the pulser member 40. The pin assembly 22 may now be in an unlatched state similar to that shown in FIG. 6A, except that the finger-engageable end 24 is recessed within the opening 26. The current to the coil 32 may be switched off and the pin assembly 22 may now be in position for the next upstroke. In this state of the pin assembly 22, no power is consumed by the display 10. As shown in FIG. 6E, a driver circuit 33 that includes a controller 35 of a software-running processor determines the timing, direction and amount of the current delivered to the coils 32.

Figure 7D:
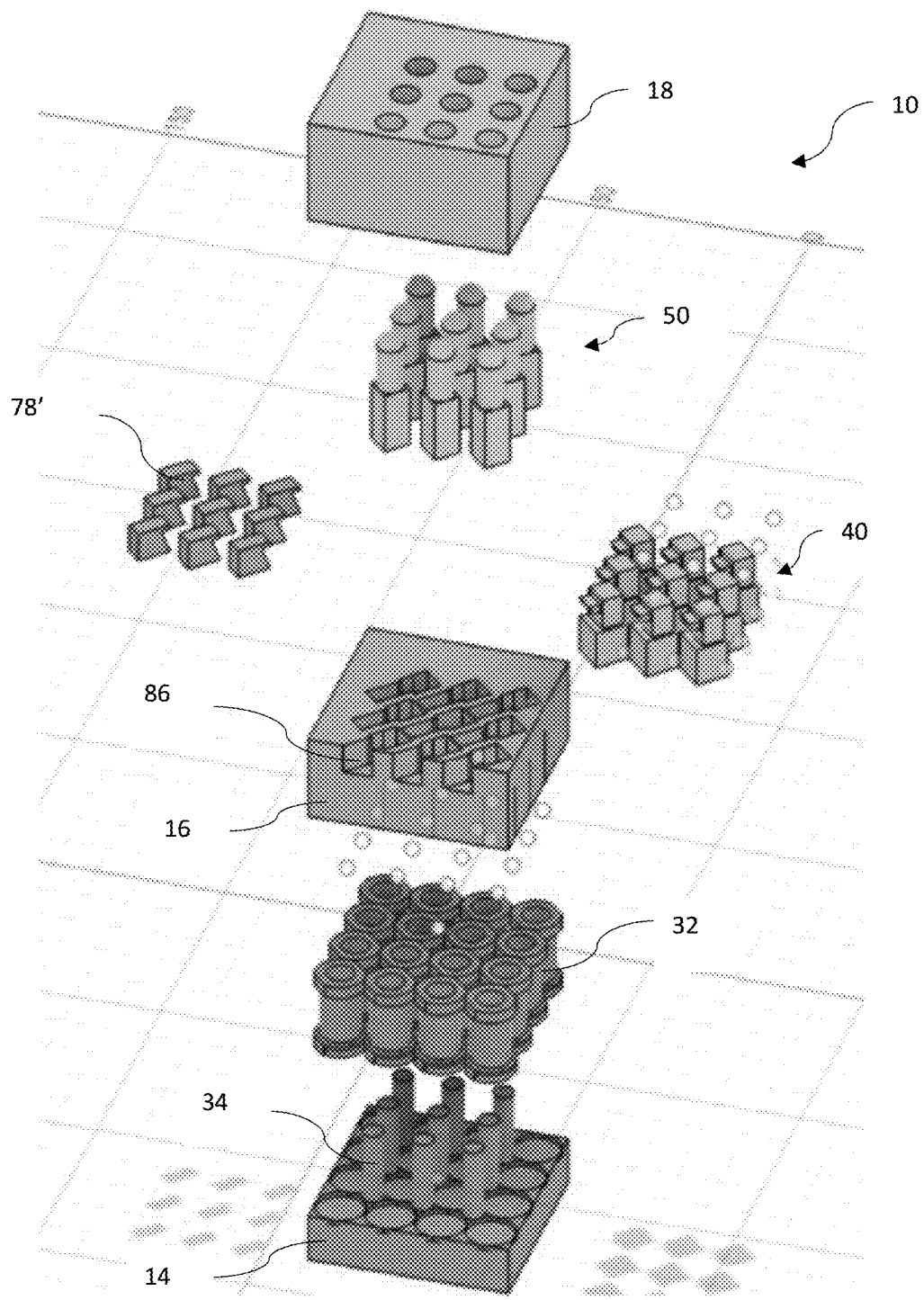
FIG. 7D illustrates the components of a tactile graphic display including the latch assembly of FIGS. 7A-7C in an exploded view according to an embodiment of the disclosure.

FIGS. 7A-C schematically illustrate an alternative version of the latch assembly 44' according to an embodiment of the disclosure. In the latched configuration of the pin assembly 22 shown in FIG. 7A, once the finger-engageable end 24 of the pin 50 reaches its upmost travel limit, the latch member 78' may slide through a channel 86 under force of a biasing member (such as a spring 75) toward the pulser member 40 such that a protrusion 82' engages the slot 74. With the protrusion 82' engaging the slot 74, the pin assembly 22 may be in a latched position such that the pin 50 is unable to move downward. As shown in FIG. 7B, movement of the pulser member 40 downward away from the pin 50 causes the angled surface 70 of the ledge 68 to engage an inner surface 84' of the latch member 78', such that the latch member 78' is pushed away from the pulser member 40. Once the protrusion 82' is no longer blocking the downward path of the pin 50, the spring 62 may act to move the pin 50 downward relative to the fourth section 20 of the frame 12. As shown in FIG. 7C, when the pulser member 40 has completed its downward travel, the finger-engageable end 24 has retracted from the opening 26 in the fourth section 20 of the frame 12 and can no longer be felt by the user. The pin 50 may move under force of the spring 62 to once again contact the pulser member 40. The pin assembly 22 may now be in the unlatched state. Embodiments of the channel 86 may be sized to fit within the available space within second portion 16 of the frame 12. FIG. 7D illustrates the components of a tactile graphic display including the latch assembly 44' in an exploded view.

Figure 8:
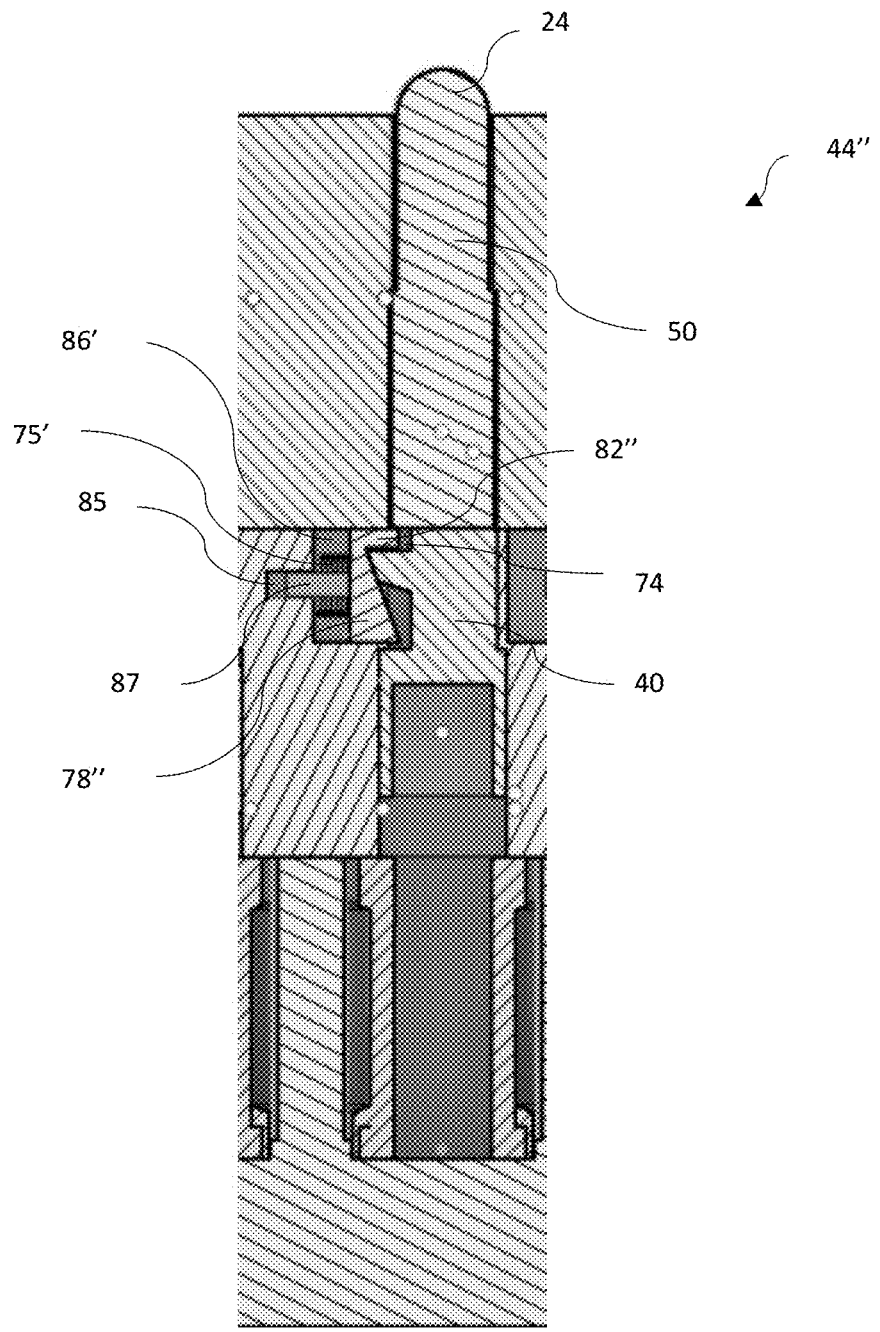
FIG. 8 schematically illustrates another version of the latch assembly of the tactile graphic display of FIGS. 1 and 2 according to an embodiment of the disclosure.

FIG. 8 illustrates another version of the latch assembly 44" according to an embodiment of the disclosure. As shown in FIG. 8, the latch assembly 44" includes a rod 87 moveable through a slot 85 in communication with a channel 86'. In the latched configuration of the pin assembly 22 shown in FIG. 8, once the finger-engageable end 24 of the pin 50 reaches its upmost travel limit, the latch member 78" may slide through the channel 86' under force of a spring 75' toward the pulser member 40 such that a protrusion 82" engages the slot 74. With the protrusion 82" engaging the slot 74, the pin assembly 22 may be in a latched position such that the pin 50 is unable to move downward. The disclosure also contemplates that the latch assembly 44 may comprise an arm that is hinged to swing sideways into the latched position when the pin assembly 22 moves upward and to move into the unlatched position when the pin assembly 22 moves downward.

Figure 9A:
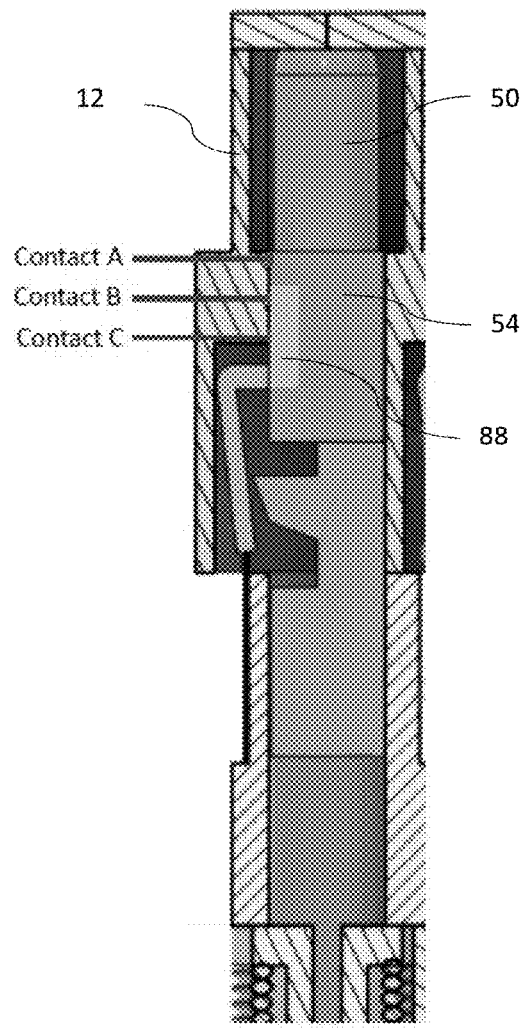
FIGS. 9A and 9B schematically illustrate a position-sensing mechanism of the tactile graphic display of FIGS. 1 and 2 according to an embodiment of the disclosure.
Figure 9B:
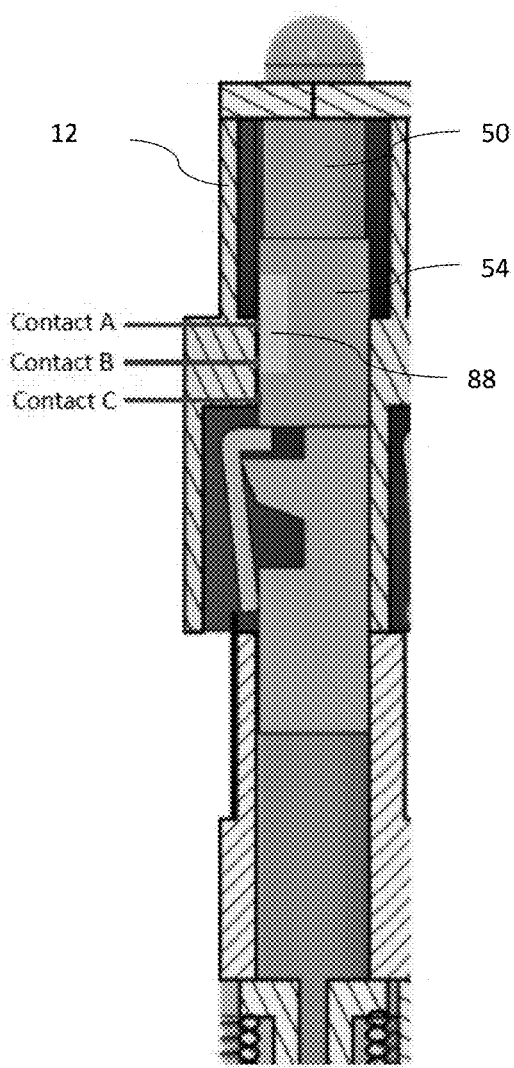

FIGS. 9A and 9B illustrate a position sensing mechanism according to an embodiment of the disclosure. As shown in FIG. 9A, when the pin 50 is in the down position, an electrically conductive contact 88 on the lower portion 54 of the pin 50 closes the circuit between spring-loaded Contacts B and C on the frame 12. Closing of this circuit indicates to the driver circuit 33 that the pin 50 has completed the downstroke successfully. As shown in FIG. 9B, when the pin 50 is in the up position, the electrically conductive contact 88 on the lower portion 54 of the pin 50 closes the circuit between spring-loaded Contacts A and B on the frame 12. Closing of this circuit indicates to the driver circuit 33 that the pin 50 has completed the upstroke successfully. The disclosure also contemplates other methods of sensing the position of the pin, such as capacitive, inductive and optical sensing.

Figure 10A:
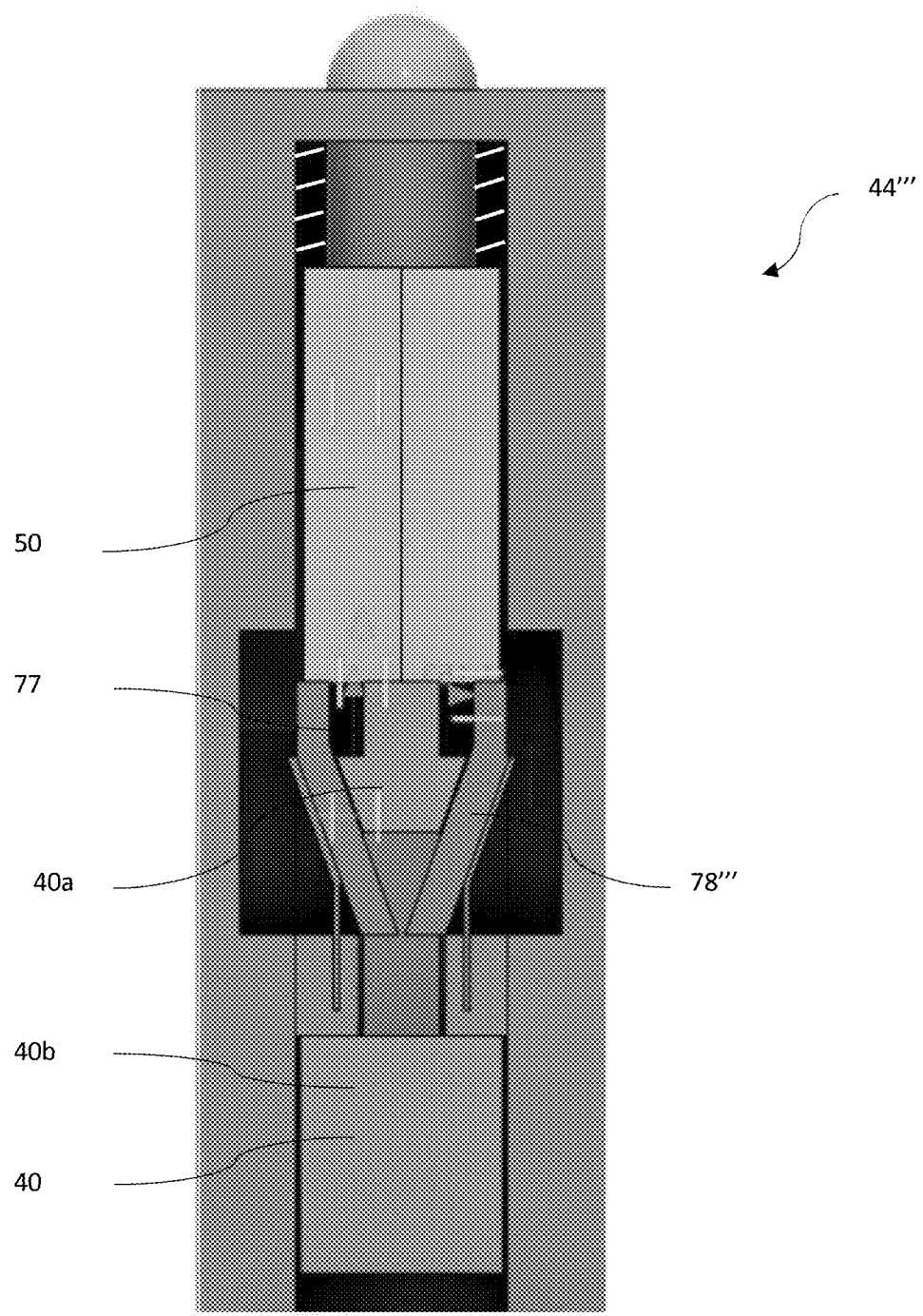
FIGS. 10A-C schematically illustrate another version of the latch assembly of the tactile graphic display of FIGS. 1 and 2 according to an embodiment of the disclosure.
Figure 10B:
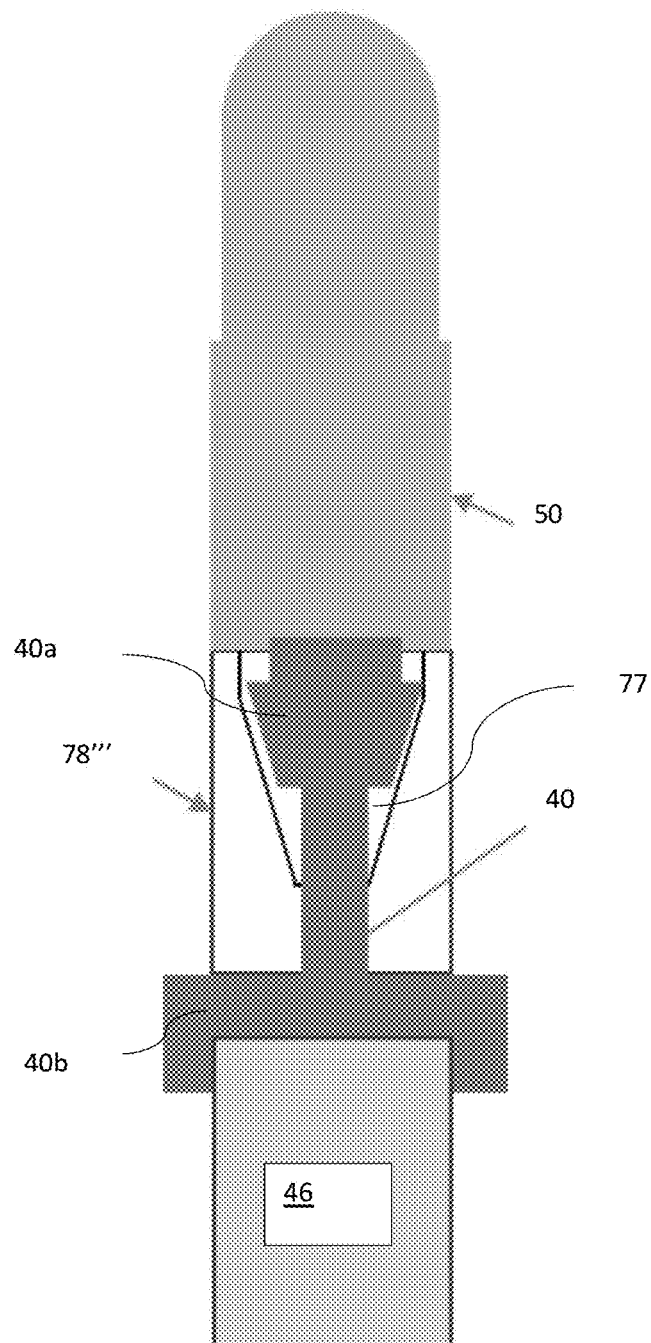
Figure 10C:
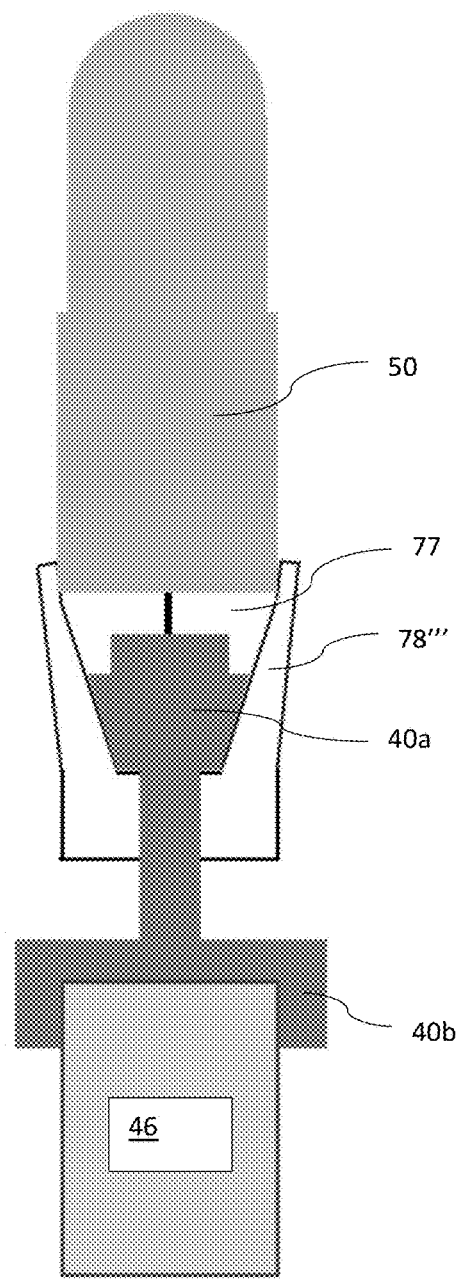

FIGS. 10A-C schematically illustrate an alternate version of the latch assembly 44' according to an embodiment of the disclosure. As shown in FIG. 10A, the latch member 78''' of this embodiment may comprise an internal angled slot 77. The pulser member 40 may include an upper portion 40a slidable within the angled slot 77 and a lower portion 40b. As shown in FIG. 10B when the pin 50 is in the up position, latch member 78''' and the upper portion 40a of the pulser member 40 may contact a lower surface of the pin 50, preventing the pin 50 from moving downward. As shown in FIG. 1013, when the magnet 46 moves down, the upper portion 40a of the pulser member 40 may move down within the angled slot 77, causing sides of the latch member 78''' to expand around the sides of the pin 50, This expansion of the latch member 78''' creates space within the slot 77 for downward movement of the pin 50 under force of the spring 62.

Figure 11A:
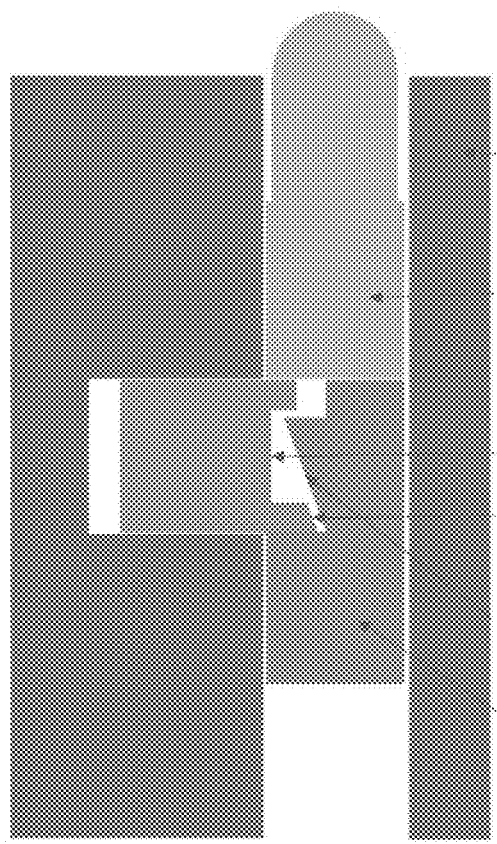
FIGS. 11A and 11B schematically illustrate another version of the latch assembly of the tactile graphic display of FIGS. 1 and 2 according to an embodiment of the disclosure.
Figure 11B:
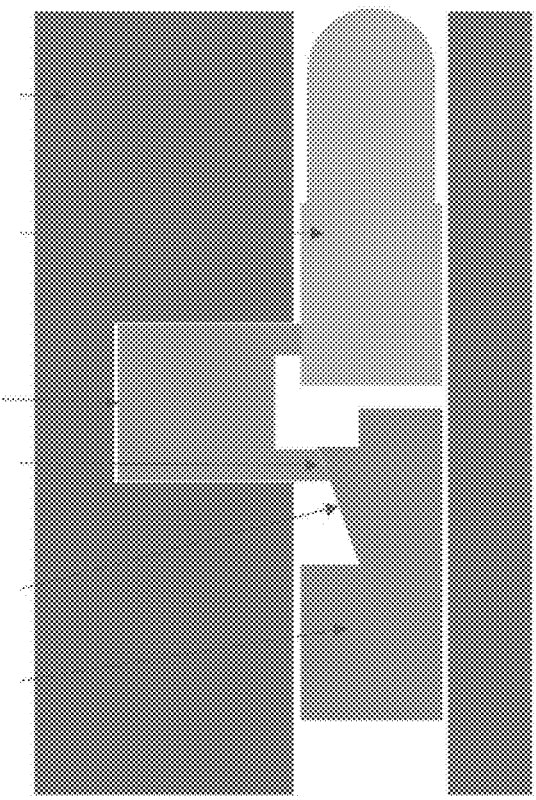

FIGS. 11A and 11B schematically illustrate an alternate version of the latch member 78'''' and pulser member 40' according to an embodiment of the disclosure. As shown in FIGS. 11A and 11B, the latch member 78'''' and pulser member 40' are substantially similar to the latch member 78' and pulser member 40 of FIGS. 7A-C. However, in this embodiment, the ledge 68' may be on the latch member 78'''' while the inner surface 84'' may be on the pulser member 40'.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

I claim:

1. A tactile graphic display comprising:
   a frame; and
   a plurality of pin assemblies extending through the frame, each one of the plurality of pin assemblies comprising:
   a pin having a first, finger-engageable end extendable and retractable through an opening in a surface of the frame;
   a pulser member having a first end configured to contact a second end of the pin, a portion of the pulser member defining a ledge, the ledge defining a slot between the second end of the pin and the ledge when the pulser member is in contact with the pin; and a magnet proximate to a second end of the pulser member, the magnet capable of transitioning between different positions relative to a coil;

wherein current applied in a first direction to the coil causes the magnet to move relative to the coil, in turn causing the first, finger-engageable end of the pin to move relative to the opening in the surface of the frame.

2. The tactile graphic display of claim 1, further comprising a spring disposed about a first region of the pin, the spring configured to bias the pin toward the coil.

3. The tactile graphic display of claim 1, further comprising a latch member configured to selectively engage and disengage from the slot for locking and unlocking a position of the pin relative to the frame.

4. The tactile graphic display of claim 1, wherein the coil is an electromagnetic coil.

5. The tactile graphic display of claim 1, wherein the magnet is a permanent magnet.

6. The tactile graphic display of claim 1, wherein the coil is configured to have a first magnetic polarity when the current is applied to the coil in the first direction, and to have a reverse magnetic polarity when the current is applied to the coil in a second direction.

7. The tactile graphic display of claim 1, wherein the frame comprises a first section coupleable to a circuit board, the first section comprising a plurality of open cavities for housing one of a plurality of the coils, and wherein, when housed within the plurality of cavities, the plurality of coils are electronically coupled to the circuit board.

8. The tactile graphic display of claim 7, wherein the frame further comprises a second section coupled to the first section, the second section defining a plurality of channels, the plurality of channels being sized and shaped for slidably receiving a lower region of the pulser member.

9. The tactile graphic display of claim 8, wherein the first section of the frame further comprises a plurality of pillars disposed between the plurality of open cavities, the plurality of pillars configured to support the second section of the frame.

10. The tactile graphic display of claim 8, wherein the second section of the frame further defines a plurality of slots extending between the plurality of channels, the plurality of slots being configured to receive a mounting portion of a latch assembly.

11. The tactile graphic display of claim 10, wherein the latch assembly further comprises a plurality of latch members flexibly coupled to the mounting portion, each of the plurality of latch members being biased toward the pulser member.

12. The tactile graphic display of claim 11, wherein the frame further comprises a third section coupled to the second section, the third section defining a plurality of through holes, the plurality of through holes being sized and shaped for slidably receiving a lower portion of the pin.

13. The tactile graphic display of claim 12, wherein the frame further comprises a fourth section coupled to the third section, the fourth section defining the opening in the surface of the frame.

14. The tactile graphic display of claim 1, wherein a second end of the pin is coupled to a shock-absorbent layer.

15. The tactile graphic display of claim 1, further comprising a position sensing mechanism for sensing a vertical position of the pin.

16. An array comprising a plurality of tactile graphic displays as claimed in claim 1.

17. A tactile graphic display comprising:
a frame; and
a plurality of pin assemblies forming an array, each one of the plurality of pin assemblies comprising:
a pin having a first, finger-engageable end extendable and retractable through an opening in a surface of the frame;
a pulser member having a first end configured to contact a second end of the pin; and
a latch member configured to selectively engage a slot defined between the pin and a ledge of the pulser member when the pulser member is in contact with the second end of the pin for locking and unlocking a position of the pin relative to the frame; and
a magnet responsive to an electrical current and disposed proximate a second end of the pulser member, the magnet and the pulser member capable of transitioning between different positions relative to the frame;
wherein a position of the magnet and the pulser member determines whether the latch member is selectively engaged or disengaged with the slot.

18. A latch assembly for use in a tactile graphic display, the tactile graphic display comprising a pin assembly, the latch assembly comprising:
at least one latch member configured to selectively engage and disengage a slot on the pin assembly for locking and unlocking a position of the pin assembly relative to a frame of the tactile graphic display, the slot defined between a ledge of a pulser member and a pin of the pin assembly when the pulser member is in contact with the pin.

19. The latch assembly of claim 18, wherein the at least one latch member is configured to be moved into an unlatched position by downward movement of the pin assembly and a magnet.

20. The latch assembly of claim 18, wherein the at least one latch member is configured to be moved into a latched position by upward movement of the pin assembly and a magnet.

* * * * *